No. 653,210. Patented July 10, 1900.
C. O. BULMER.
NUT LOCK.
(Application filed Mar. 16, 1900.)

(No Model.)

WITNESSES
Louis D. Heinrichs
Herbert D. Lawson

INVENTOR
Charles O. Bulmer
By Victor J. Evans.
Attorney

United States Patent Office.

CHARLES O. BULMER, OF NOOKSACHK, WASHINGTON.

NUT-LOCK.

SPECIFICATION forming part of Letters Patent No. 653,210, dated July 10, 1900.

Application filed March 16, 1900. Serial No. 8,932. (No model.)

*To all whom it may concern:*

Be it known that I, CHARLES O. BULMER, a citizen of the United States, residing at Nooksachk, in the county of Whatcom and State of Washington, have invented certain new and useful Improvements in Nut-Locks, of which the following is a specification.

This invention relates to new and useful improvements in nut-locks; and its primary object is to provide a device of this character which is simple and effective and which may be readily applied.

To these ends the invention consists in grooving a nut and embedding therein a ring the ends of which are adapted to engage with the bolt and prevent the same from turning within the nut.

The invention also consists in the further novel constructions and combinations of parts hereinafter more fully described and claimed, and illustrated in the accompanying drawings, showing the preferred form of my invention, and in which—

Figure 1:
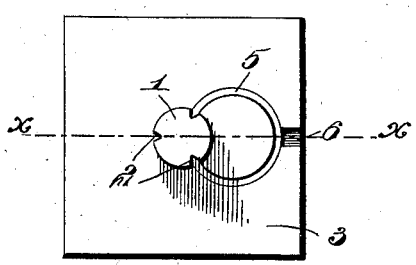
Figure 2:
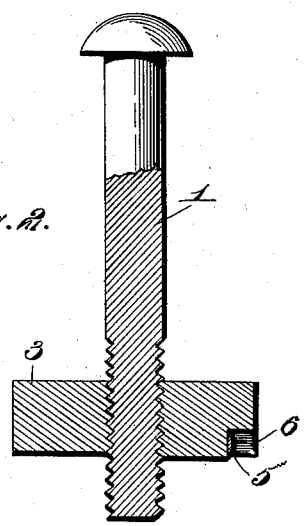
Figure 3:
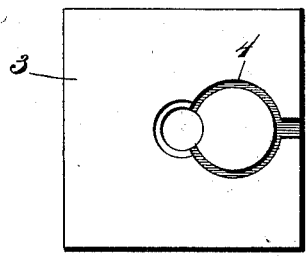
Figure 4:
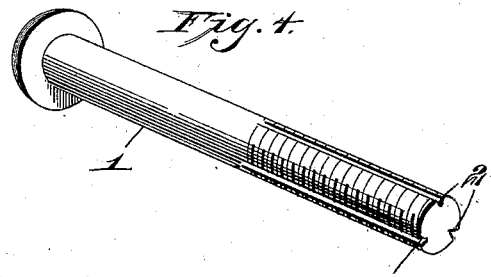
Figure 5:
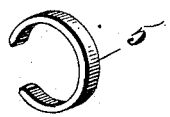

Figure 1 is an end view of a bolt and nut with my lock applied thereto. Fig. 2 is a section on line $x$ $x$, Fig. 1. Fig. 3 is a detail view of the nut. Fig. 4 is a similar view of the bolt, and Fig. 5 is a detail view of the ring.

Referring to said figures by numerals of reference, 1 is a bolt provided with two or more longitudinally-extending grooves 2 and having a nut 3 engaging therewith. This nut may be of any desired size or material and is provided within one of its surfaces with a circular groove 4, adapted to receive a ring 5, formed of any suitable metal and the tapered ends of which project into the grooves 2 of the bolt. A groove 6 may, if desired, extend from the circular groove 4 to the edge of the nut, whereby a tool may be readily inserted under the ring 5 for the purpose of removing the same from its groove. That portion of the nut which is within the groove 4 preferably extends above the level of the remainder of the nut and may, if desired, be turned or welded down over the ring in order to secure the same in position.

By this construction it will be seen that I secure a device which is both simple and effective and which may be cheaply manufactured.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus fully described my invention, what I claim as new, and desire to secure by Letters Patent, is—

1. In a nut-lock the combination, with a grooved bolt, of a nut, a raised cylindrical portion thereon inclosed by a groove, and a ring in said groove adapted to engage the grooves in said bolt.

2. In a nut-lock the combination, with a grooved bolt, of a nut, a raised cylindrical portion thereon inclosed by a groove, a ring in said groove, and ends to the ring projecting from the groove in the plane thereof and engaging the grooves in the bolt.

In testimony whereof I affix my signature in presence of two witnesses.

CHARLES O. BULMER.

Witnesses:
  M. COLE,
  E. S. REAM.